United States Patent [19]

Massey et al.

[11] 4,200,731

[45] Apr. 29, 1980

[54] ENDCAPPED POLYESTERS

[75] Inventors: Fred L. Massey, Uniontown; Trent A. Sponseller, Hartville, both of Ohio

[73] Assignee: The Goodyear Tire & Rubber Company, Akron, Ohio

[21] Appl. No.: 8,639

[22] Filed: Feb. 1, 1979 (Under 37 CFR 1.47)

[51] Int. Cl.$^2$ ............................................. C08G 63/20
[52] U.S. Cl. ................................... 525/437; 528/288; 528/289
[58] Field of Search .................... 528/273, 288, 289

[56] References Cited

U.S. PATENT DOCUMENTS

| | | |
|---|---|---|
| 3,769,366 | 10/1973 | Fessler et al. ................... 528/288 X |
| 3,959,215 | 5/1976 | Schneider ........................ 528/273 X |
| 3,968,015 | 7/1976 | Nyberg ........................... 528/273 X |
| 4,022,752 | 5/1977 | Horn et al. ...................... 528/288 X |
| 4,081,428 | 3/1978 | Thompson ....................... 528/288 X |

Primary Examiner—Lucille M. Phynes
Attorney, Agent, or Firm—Oldham, Oldham, Hudak & Weber

[57] ABSTRACT

The polyesters are endcapped by reacting them generally with substituted benzoyl-lactams or substituted benzoyl-phthalimides at a temperature usually above the melting point of the polyester to form a benzoyl end group. Such endcapped polymers have improved properties such as thermal-oxidative aging, molecular weight retention, tensile strength retention, and improved stability.

20 Claims, No Drawings

ENDCAPPED POLYESTERS

BACKGROUND OF THE INVENTION

The present invention relates to endcapped polyesters.

Heretofore, polyesters have been prepared by the reaction of dicarboxylic acids with glycols. The end result was a polyester which usually had a combination of hydroxyl and carboxyl end groups. Under thermal-oxidative conditions, these end groups degrade the polymer with regard to molecular weight. Thus, with time, polyesters generally exhibit a loss in various physical properties such as thermal stability, tensile strength, flex strength, and the like. However, polyesters, when endcapped according to the present invention, exhibit good to excellent retention of all these properties.

SUMMARY OF THE INVENTION

It is, therefore, an object of the present invention to provide polyesters with stabilized endcap groups.

It is another object of the present invention to provide a stabilized endcap group on polyesters, as above, wherein said endcap group is a benzoyl.

It is a further object of the present invention to provide a stabilized endcap group for polyesters, as above, wherein said encap polyester polymers have improved physical retention properties.

It is an additional object of the present invention to provide a stabilized endcap group for polyesters, as above, wherein said endcap groups are added by reacting either a substituted benzoyl-lactam or a substituted benzoylphthalimide with a terminal hydroxyl group of said polyester.

It is still another object of the present invention to provide a stabilized endcap group for polyesters, as above, wherein said polymer is generally any type of polyester including those made from linear or aliphatic acids.

It is a still further object of the present invention to provide a stabilized endcap group for polyesters, as above, wherein the endcap compound can be added during the final polymerization stage in the preparation of said polyester or at any later point in time such as upon extrusion.

It is a still additional object of the present invention to provide a stabilized endcap group for polyesters, as above, wherein said polyesters are stabilized with regard to bond cleavage upon aging.

These and other objects of the present invention will be more apparent by reference being given to the preferred embodiments of the invention.

In general, a process for endcapping a polyester comprises the steps of: adding an endcapping compound to the polyester, said endcapping compound selected from the class consisting of

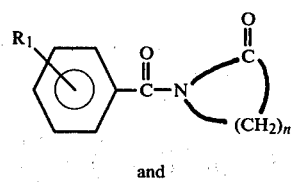

and

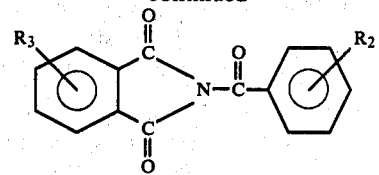

where $R_1$, $R_2$ and $R_3$ are selected from the class consisting of hydrogen, a halide, an alkyl, an aryl, and an alkyl substituted aryl, and wherein n is 2 to 14, said halide selected from the class consisting of fluorine, chlorine, iodine and bromine, said alkyl having from 1 to 8 carbon atoms, said aryl having from 6 to 14 carbon atoms, said alkyl substituted aryl having from 5 to 15 carbon atoms, said polyester having at least one hydroxyl end group, the amount of said endcapping compound ranging from about 0.1 to about 3.0 equivalents per said hydroxyl end group, mixing said polyester polymer with said endcapping compound, heating said polyester polymer with said endcapping compound to at least the reaction temperature of said endcapping compound, and reacting said endcapping compound with said hydroxyl end group of said polyester so that said polyester contains an end group having the structure

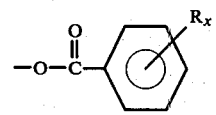

where $R_x$ is said $R_1$ or said $R_2$.

Additionally, a polyester polymer composition comprises: a plurality of polyester chains, a substituted number of said polyesters having at least one end group of the formula

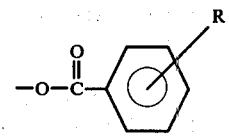

wherein R is selected from the class consisting of hydrogen, a halide, an alkyl, an aryl, and an alkyl substituted aryl, said halide selected from the class consisting of fluorine, chlorine, iodine, and bromine, said alkyl having from 1 to 8 carbon atoms, said aryl having from 6 to 14 carbon atoms, and said alkyl substituted aryl having from 5 to 15 carbon atoms.

PREFERRED EMBODIMENTS OF THE INVENTION

As known to those skilled in the art, polyesters, although normally containing both hydroxyl and carboxylic end groups, will generally contain a predominance of hydroxyl end groups.

According to the concepts of the present invention, the hydroxyl end groups of numerous different types, such as those set forth in the existing literature, as well as typical or conventional polyesters known to those skilled in the art can be endcapped. Such polyesters include polymers formed from dicarboxylic acids containing a total of from 2 to 16 carbon atoms reacted with polyhydric alcohols such as a glycol containing from 2 to 12 carbon atoms. The dicarboxylic acids may be an alkyl and contain a total of from 2 to 16 carbon atoms. Preferably, the acids are aryl or an alkyl substituted aryl containing from 8 to about 16 carbon atoms. Specific examples of linear or alkyl dicarboxylic acids include oxalic acid, malonic acid, succinic acid, glutaric acid, adipic acid, pimelic acid, suberic acid, azelaic acid, sebacic acid, and the like. Specific examples of an aryl acid include the various isomers of phthalic acid, such as para-phthalic acid (terephthalic acid) and naphthalic acid. Specific examples of alkyl substituted aryl acids include the various isomers of dimethylphthalic acid such as dimethylisophthalic acid, dimethylorthophthalic acid, dimethylterephthalic acid, the various isomers of diethylphthalic acid such as diethylisophthalic acid, diethylorthophthalic acid, diethylterephthalic acid, the various isomers of dimethylnaphthalic acid such as 2,6-dimethylnaphthalic acid and 2,5-dimethylnaphthalic acid, and the various isomers of diethylnaphthalic acid. Generally, dimethylterephthalic acid is preferred with terephthalic acid being highly preferred.

As well known to those skilled in the art, in lieu of the various dicarboxylic acids, the various esters thereof may be utilized. Thus, alkyl esters containing a total of from 2 to about 20 carbon atoms as well as alkyl substituted aryl esters containing from about 10 to about 20 carbon atoms may be utilized. Examples of specific alkyl diesters include dimethyl acetate, diethyl acetate, and the like. Specific examples of various alkyl substituted aryl diesters include the various isomers of the dimethylphthalate, the various isomers of diethylphthalate, the various isomers of dimethylnaphthalate, and the various isomers of diethylnaphthalate.

The glycols may be straight-chained or branched. Specific examples include ethylene glycol, propylene glycol, trimethylene glycol, 1,2-butane diol, 1,3-butane diol, 1,4-butane diol, 2,3-butane diol, neopentyl glycol, and the like. Of the various glycols, those having from 2 to 8 carbon atoms are preferred, with ethylene glycol and 1,4-butane diol being highly preferred.

In lieu of the various glycols, another class of polyhydric alcohols, such as the glycol ethers containing from 4 to 12 carbon atoms can be utilized such as dimethylene glycol and 1,4-dihydroxyethoxy benzene.

Naturally, various other compounds may be utilized to form polyesters. The important aspect of the present invention is that a polyester containing a hydroxyl end group (that is, one or both) can be stabilized to better retain their physical properties. Of course, the preparation of a particular polyester is in accordance with conventional or known methods and is not a part of the present invention. Generally, the polyester has an average number molecular weight of from about 14,000 to about 75,000 with a preferred weight of from about 34,000 to about 42,000.

According to the present invention, it has been found that polyesters such as the above, will have improved stability, for example, with regard to thermal stability, abatement of cleavage of bonds, and the like, when they are endcapped with a specific end group. The endcap group of the present invention is a substituted benzoate and, preferably, benzoate. This endcap group is substituted essentially for the hydrogen radical of the hydroxyl end group or groups of a polyester such that a substituted benzoate ester or a benzoate ester is formed on the end of the polyester. Normally, the benzoyl endcapping compound of the present invention will not react with a carboxyl end group of a polyester.

One of the compounds which can be reacted with a polyester to form stable benzoate ester end groups are the substituted benzoyl-lactams which have the following structural formula

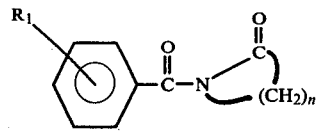

The lactam portion of the compound may contain from 3 to 15 total carbon atoms and, hence, n ranges from 2 to 14 carbon atoms. A lactam radical having a total of 5 carbon atoms is preferred with a total of 6 carbon atoms, that is caprolactam, being highly preferred. The substituted group $R_1$ on the benzene ring may be hydrogen, a halogen, an alkyl having from 1 to 8 carbon atoms, an aryl having from 6 to 14 carbon atoms or an alkyl substituted aryl having from 5 to 15 carbon atoms. Specific examples of halogens include fluorine, chorine, iodine, and bromine. Specific examples of alkyl groups include methyl, ethyl, propyl, isopropyl, butyl, pentyl, hextyl, heptyl, and the like. Specific examples of aryl groups include phenyl and naphthyl. Specific examples of alkyl substituted aryls include the various isomers of dimethyl benzene so that the end group added is dimethylphenyl-benzoyl, for example, 2,6-dimethylphenyl-benzoyl or 2,5-dimethylphenyl-benzoyl. Although $R_1$ as an alkyl group is preferred, a hydrogen radical is highly preferred. Thus, a highly preferred benzoyl-lactam for the present invention is N-benzoyl-E-caprolactam which forms a benzoate end group.

Another compound which may be reacted with the polyester to form the desired endcapping groups of the present invention are the substituted benzoyl-phthalimides wherein the phthalimide group is also substituted. This compound has the following structure

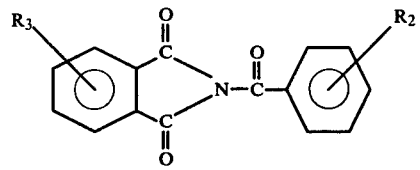

wherein $R_2$ and $R_3$ are the same as $R_1$ set forth above. As before, the compound wherein $R_2$ and $R_3$ is hydrogen (that is, the hydrogen radical) is highly preferred. Thus, the preferred endcapping compound is therefore N-benzoyl-phthalamide.

Generally, the benzoyl-lactams are preferred over the benzoyl-phthalimide endcapping compounds. Regardless of the type of endcapping compound used, the hydrogen atom of the hydroxyl end group of the polyester is replaced by the benzoyl group so that the following benzoate end group is produced

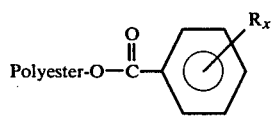

wherein $R_x$ is $R_1$ or $R_2$. Thus, the polyester has an aryl ester end group.

From about 0.1 to about 3.0 equivalents of said endcapping compound is added and reacted with said hydroxyl end groups of said polyester to form said benzoate ester end group. Since, generally, it is desirable to react all the hydroxyl end groups of said polyester polymer, preferably from about 1.0 to about 2.2 equivalents of said compound is added with a highly preferred amount being approximately 1.0 to 1.1 equivalents. Since it is desirable that most and preferably all of the hydroxyl end groups are reacted, preferably, the benzoyl-lactam compound or the benzoyl-phthalimide compound is thoroughly mixed with the polyester and heated. To ensure good mixing, the polyesters are preferably heated to at least their melting point and generally from about 220° C. to about 300° C. At temperatures above 300° C., the polyester will generally degrade. A more suitable reaction range is from about 220° C. to about 285° C. Since the highly preferred polyester is poly(ethylene terephthalate) which has a melting point range of from about 255° C. to about 262° C., the reaction temperature is at least from about 255° C. to about 280° C.

The heating, mixing and reaction steps may be carried out at any desirable period in time, such as at the end of the polymerization or formation of the polyester, at some later point in time, as during a physical precoating step of said polyester, and the like. Moreover, any mixing apparatus may be utilized such as a Banbury Mixer, a mill, an extruding apparatus, or the like.

Various common or conventional additives can also be added to the polyesters as done in accordance with prior practice, for example, dyes, ultraviolet inhibitors, stabilizers, and the like, in various conventional amounts.

The endcapped polymers of the present invention generally have a high molecular weight, i.e., an intrinsic viscosity of about 0.85 to 1.1 and, thus, may be utilized in the form of yarn, cord, or monofilament, as for conveyor belts, drying screens (as used in the pulp industry), fan belts, tire cord, and the like.

The invention will be better understood by reference to the following examples.

EXAMPLE I

Poly(ethyleneterephthalate) Endcapped With N-Benzoyl-E-Caprolactam

CHARGE WEIGHTS

| | |
|---|---|
| Dimethylterephthalate (DMT, manufactured by Amoco) | 70.0 g. |
| Ethylene glycol (EG, manufactured by Union Carbide, 2.24 moles; 1 mole DMT) | 45.0 ml. |
| Manganous acetate Tetrahydrate (76 ppm Mn) | 0.0238 g. |
| Triphenyl phosphite (4.55% in benzene, 40 ppm P in the polymer) | 0.70 ml. |
| Antimony Trioxide (212 ppm Sb) | 0.0176 g. |
| N-Benzoyl-E-Caprolactam (Hydroxyl endcapping agent) | 0.7191 g. |

CONDITIONS

Dimethylterephthalate (DMT) and ethylene glycol (EG) was added initially to a vessel. Manganous acetate was then charged in dry form and nitrogen purge was used until full vacuum was reached, then the nitrogen was shut off. Triphenyl phosphite was then added after completion of the first stage (transeseterification; i.e., all methanol had been removed). Antimony trioxide was added about 5 to 10 minutes after the triphenyl phosphite vacuum strip of ethylene glycol. The N-benzoyl-E-caprolactam was added in the amount theoretically needed for complete reaction with all the terminal hydroxyl groups in a 0.65 IV homopolymer of poly(ethyleneterephthalate) assuming 50% hydroxyl termination.

DATA

| TIME | BATH TEMP. (°C.) | PRESSURE (mm Hg) | DISTILLATE | | COMMENTS |
|---|---|---|---|---|---|
| 8:45 | 23° | atm. | none | | Initial reading, heat on at set point of 190° |
| 9:15 | 190° | atm. | 12 | ml. | Heat set up to 200° |
| 9:30 | 200° | atm. | 19.5 | ml. | Heat set up to 225° |
| 10:30 | 225° | atm. | 28 | ml. | Added triphenyl phosphite, then antimony trioxide and the agitator |
| 10:55 | 225° | atm. | none | | Temperature set up to 280° C., started vacuum pull down |
| 11:10 | 280° | 35 mm | 19.5 | ml. | |
| 11:25 | 280° | 4.5 mm | 21 | ml. | |
| 11:30 | 280° | 2.2 mm | 21 | ml. | Controlled vacuum leak completely closed, but nitrogen purge still on |
| 12:30 | 280° | 2.2 mm | 21.75 | ml. | The polymer was viscous enough to be pulled around with the agitator |
| 12:35 | 280° | 0.07 mm | 21.75 | ml. | |
| 3:05 | 280° | 0.04 mm | 22 | ml. | Broke vacuum using nitrogen, added the N-benzoyl-ε-caprolactam, mixed for 5 minutes, polymer |
| 6:20 TOTAL | | | 50 TOTAL | ml. | stayed clear, removed part of the sample during about 5 minutes and shut down. The polymer showed very slight signs darkening after mixing in the lactam for about 3 or 4 minutes. The first polymer to be removed was light yellow, but when removed, about 5 minutes later, it was a definite yellow to a very light tan. The time, though there was no obvious I.V. loss after adding and mixing in the N-benzoyl-ε-caprolactam. |

Theo. methanol = 23.09 g = 29.16 ml.
Theo. ethylene glycol = 27.49 g. = 24.7 ml (for a 0.65 IV polymer)
Total theo. condensate = 53.9 ml.
Total actual condensate = 50 ml. (93% theo.)
IV = 0.56  COOH = 35  DTA MP = 257.0° C.

EXAMPLE II

In a manner identical to Example I except that 0.0178 grams of antimony trioxide was utilized and 1.0786 grams of N-benzoyl-E-caprolactam was used. Moreover, the pressure was very similar at the various stages of the reaction and the time period of each stage was identical to Example I. The polymer had an IV of 0.53, a COOH content of 37 and a DTA of 256° C.

EXAMPLE III

Polyethyleneterephthalate was endcapped with N-benzoyl-E-caprolactam in a manner similar to Example I except that 0.0178 grams of antimony trioxide and 1.4383 grams of N-benzoyl-E-caprolactam was utilized. The polymer had an IV of 0.43, a COOH content of 41 and a DTA of 252° C.

The control was made in a similar manner except, of course, no N-benzoyl-E-caprolactam was added.

Table I sets forth the initial polymeric properties of a control as well as three examples which contained 0.50, 0.75 and 1.0 equivalents of N-benzoyl-E-caprolactam (NBC) per polyester hydroxyl or carboxyl end group.

TABLE I

| INITIAL POLYMER PROPERTIES | | | | |
|---|---|---|---|---|
|  | CONTROL | SAMPLE 1 | SAMPLE 2 | SAMPLE 3 |
| Equivalence of N-benzoyl-E-Caprolactam Added/Equivalents of End Groups* | None | 0.500 | 0.750 | 1.000 |
| Intrinsic Viscosity | 0.63 | 0.56 | 0.53 | 0.43 |
| COOH | 39 | 35 | 37 | 41 |
| DTA (°C.) | 255.5 | 257.9 | 256.0 | 252.0 |
| Weight Percent Diethylene Glycol | 0.91 | 0.85 | 0.92 | 0.82 |

*Based on a 0.65 IV polymer

As apparent from Table I, the initial polymer properties revealed that the polyesters which contain the benzoate ester endcapped groups had lower intrinsic viscosity, COOH groups, and generally a lower amount by weight of diethylene glycol.

The effect of thermal-oxidative aging on the polymers was tested for a period of days at 200° C. (392° F.) and the results are set forth in Table II.

TABLE II

| EFFECT OF THERMAL-OXIDATIVE AGING ON POLYMER I.V. 200° C. (392° F.) | | | | |
|---|---|---|---|---|
|  | I.V. | | | |
| SAMPLE | ORIGINAL | 1 DAY | 2 DAYS | 3 DAYS |
| Control | 0.63 | 0.19 | 0.19 | 0.20 |
| 0.5 NBC | 0.56 | 0.22 | 0.23 | 0.20 |
| 0.75 NBC | 0.53 | 0.26 | 0.21 | 0.19 |
| 1.0 NBC | 0.43 | 0.31 | 0.24 | 0.21 |

As apparent from Table II, the intrinsic viscosity retention with time was better than the control and especially with higher amounts of NBC.

The effect of thermal-oxidative aging on broken bonds is set forth in Table III.

TABLE III

| EFFECT OF THERMAL-OXIDATIVE AGING ON BROKEN BONDS 200° C. (392° F.) | | | |
|---|---|---|---|
|  | Moles of Broken Bonds/$10^6$g | | |
| SAMPLE | 1 DAY | 2 DAYS | 3 DAYS |
| Control | 220* | 220* | 220 |
| 0.5 NBC | 175 | — | 211 |
| 0.75 NBC | 119 | 187 | 206* |
| 1.0 NBC | 54 | 119 | 182 |

*For the purpose of calculating the broken bond data, 0.19 of 0.20 IV's were considered to be within analytical error and 0.20 was used for both.

Table III points out intrinsic viscosity retention with regard to broken bond data; and, it is very apparent that adding increasing amounts of N-benzoyl-E-caprolactam to the polymer lowers the amount of bond cleavage and, hence, improves intrinsic viscosity retention.

Table IV relates to the carboxyl chain with thermal-oxidative aging.

TABLE IV

| CARBOXYL CHANGE WITH THERMAL-OXIDATIVE AGING 3 DAYS AT 200° C. (392° F.) | | |
|---|---|---|
|  | COOH (eq/$10^6$g) | |
| Sample | Original | Final |
| Control | 39 | 1,063 |
| 0.5 NBC | 35 | 524 |
| 0.75 NBC | 37 | 449 |
| 1.0 NBC | 41 | 383 |

Table IV reveals that dramatically reduced carboxyl contents are achieved after three days of thermal-oxidative degradation.

Table V sets forth the thermal-oxidative effect on hydroxyl end groups.

TABLE V

| THERMAL-OXIDATION OF HYDROXYL END GROUPS 3 DAYS AT 200° C. (392° F.) | |
|---|---|
| Sample | Equivalence of Carboxyl Groups/$10^6$g Formed by 2-Hydroxyethyl End Group Degradation* |
| Control | 804 |
| 0.5 NBC | 278 |
| 0.75 NBC | 206 |
| 1.0 NBC | 160 |

*This value was calculated by substrating the original carboxyl number and the number of equivalents of carboxyls produced by chain scission from the measured carboxyl number.

A dramatic improvement in the amount of carboxyl groups formed by 2-hydroxyethyl end group degradation is apparent. In fact, there was less than one fifth as many equivalents of carboxyl groups formed utilizing the sample reacted with 1.0 equivalents of NBC as there was in either of the controls.

Hence, it can be seen from Tables II through V that stability, especially thermal stability, was greatly improved. This not only results in molecular weight retention, but also tensile strength retention, flex strength retention, and the like.

However, the endcapping which produced benzoate esters did result in an initial intrinsic viscosity loss. It is speculated that this may have occurred because of the non-selectivity of the endcapping compound for terminal hydroxyl groups, that is the endcapping compound is thought to also attach the ester links in the chain. However, this drawback can easily be corrected by adding a mixture of difunctional N,N'-terephthaloyl-bis(E-caprolactam) as well as N-benzoyl-E-caprolactam, instead of only the latter. Thus, the interlinking effect of the difunctional compound should counteract the intrinsic viscosity loss and a normal intrinsic viscosity polyester solution with good thermal stability should be obtained. The second possibility would be to merely start with a higher intrinsic viscosity polymer such that the loss would bring the viscosity down to a desired value.

Thus, it can be seen that notable improvements in the stability of the polyester polymer were produced.

While in accordance with the patent statutes a detailed description of the preferred embodiment and best mode has been set forth, the invention is measured by the attached claims.

What is claimed is:

1. A process for endcapping a polyester, comprising the steps of:
    adding an endcapping compound to the polyester, said endcapping compound selected from the class consisting of

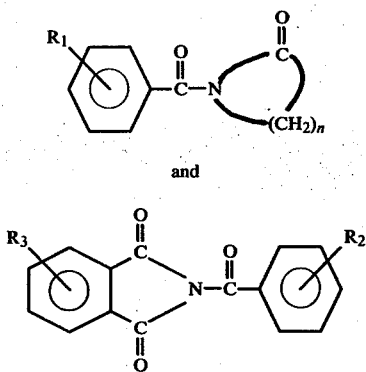

and where $R_1$, $R_2$ and $R_3$ are selected from the class consisting of hydrogen, a halide, an alkyl, an aryl, and an alkyl substituted aryl, and wherein n is 2 to 14, said halide selected from the class consisting of fluorine, chlorine, iodine and bromine, said alkyl having from 1 to 8 carbon atoms, said aryl having from 6 to 14 carbon atoms, said alkyl substituted aryl having from 5 to 15 carbon atoms, said polyester having at least one hydroxyl end group, the amount of said endcapping compound ranging from about 0.1 to about 3.0 equivalents per said hydroxyl end group, mixing said polyester polymer with said endcapping compound, heating said polyester polymer with said endcapping compound to at least the reaction temperature of said endcapping compound, and reacting said endcapping compound with said hydroxyl end group of said polyester so that said polyester contains an end group having the structure

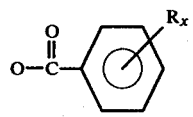

where $R_x$ is said $R_1$ or said $R_2$.

2. A process according to claim 1, wherein said heating temperature is at least the melting temperature of said polyester polymer.

3. A process according to claim 2, wherein said heating temperature ranges from about 220° C. to about 300° C.

4. A process according to claim 3, wherein $R_1$, $R_2$, and $R_3$ are hydrogen or said alkyl, and n is 4 or 5.

5. A process according to claim 4, wherein the amount of said endcapping compound ranges from about 1.0 to 2.2 equivalents per said hydroxyl end group.

6. A process according to claim 5, wherein $R_1$ and $R_2$ are hydrogen, and wherein said heating temperature ranges from about 255° C. to about 280° C.

7. A process according to claim 6, wherein the amount of said endcapping compound is about 1.0 to 1.1 equivalents.

8. A process according to claim 1, wherein said polyester compound is made from the reaction of dicarboxylic acids or esters and polyhydric alcohols, said dicarboxylic acids selected from the class consisting of alkyl dicarboxylic acids having a total of from 2 to 16 carbon atoms, an alkyl ester having from 2 to 20 carbon atoms, aryl dicarboxylic acids containing a total of from 8 to about 16 carbon atoms, and an alkyl substituted aryl ester having from 10 to 20 carbon atoms, and wherein said polyhydric alcohol is selected from the class consisting of glycols having from 2 to 12 carbon atoms, and from glycol ethers containing from 4 to 12 carbon atoms.

9. A process according to claim 8, wherein said heating is at a temperature of at least the melting point of said polyester polymer and wherein said polyhydric alcohol is a glycol containing from 2 to 8 carbon atoms, and wherein said dicarboxylic acid is said aryl dicarboxylic or said substituted aryl dicarboxylic acid.

10. A process according to claim 9, wherein $R_1$, $R_2$ and $R_3$ are hydrogen or said alkyl.

11. A process according to claim 10, wherein the amount of said endcapping compound ranges from about 1.0 to about 2.2 equivalents per hydroxyl end group.

12. A process according to claim 11, wherein said dicarboxylic acid is selected from the class consisting of dimethylterephthalic acid or terephthalic acid and said glycol is selected from the class consisting of ethylene glycol and 1,4-butane diol.

13. A process according to claim 12, wherein said endcapping compound is N-benzoyl-E-caprolactam and wherein said heating temperature ranges from about 255° C. to about 270° C.

14. A polyester polymer composition, comprising:
    a plurality of polyester chains, a substantial number of said polyesters having at least one end group of the formula

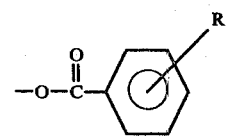

wherein R is selected from the class consisting of hydrogen, a halide, an alkyl, an aryl, and an alkyl substituted aryl, said halide selected from the class consisting of fluorine, chlorine, iodine, and bromine, said alkyl having from 1 to 8 carbon atoms, said aryl having from 6 to 14 carbon atoms, and said alkyl substituted aryl having from 5 to 15 carbon atoms.

15. A polyester composition according to claim 14, wherein R is hydrogen or said alkyl.

16. A polyester composition according to claim 15, wherein R is hydrogen.

17. A polyester composition according to claim 14, wherein said polyester polymer is made from the reaction of dicarboxylic acids or esters and polyhydric alcohols, said dicarboxylic acid or ester being selected from the class consisting of alkyl dicarboxylic acids having a total of from 2 to 16 carbon atoms, an alkyl ester having from 2 to 20 carbon atoms, aryl dicarboxylic acids containing a total of from 8 to about 16 carbon atoms, and an alkyl substituted aryl ester having from 10 to 20 carbon atoms, and wherein said polyhydric alcohol is selected from the class consisting of glycols having from 2 to 12 carbon atoms, and from glycol ethers containing from 4 to 12 carbon atoms.

18. A polyester composition according to claim 17, wherein said polyhydric alcohol is a glycol containing from 2 to 8 carbon atoms, and wherein said dicarboxylic acid is said aryl dicarboxylic acid or said alkyl substituted aryl dicarboxylic acid.

19. A polyester composition according to claim 18, wherein R is hydrogen or said alkyl.

20. A polyester composition according to claim 19, wherein R is hydrogen and wherein said polyester is made from dimethylterephthalic acid or terephthalic acid and said glycol is ethylene glycol or 1,4-butane diol.

* * * * *